3,478,051
AZECINO- AND AZONINO[5,4-b]INDOLES
William J. Houlihan, Mountain Lakes, and Robert E. Manning, Parsippany, N.J., assignors to Sandoz Inc., Hanover, N.J.
No Drawing. Filed Mar. 17, 1967, Ser. No. 623,801
Int. Cl. C07d 99/02; A61k 27/00
U.S. Cl. 260—326.12     13 Claims

ABSTRACT OF THE DISCLOSURE

Azonino and azecino[5,4-b]indoles are CNS-active compounds which are useful as antidepressants and also as anti-inflammatories. They are prepared from a tryptamine and an ω-acyl-substituted-propionic or butyric acid. Tetracyclic intermediates are also useful in view of their CNS-stimulant activity.

---

The compounds of this invention are azonino and azecino[5,4-b]ndoles of the formula

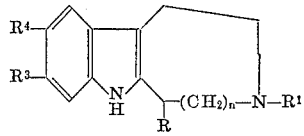

I wherein:

R is either straight chain lower alkyl having from 1 to 4 carbon atoms, i.e. methyl, ethyl, propyl and butyl; Ar, e.g. phenyl and p-tolyl; or aralkyl of the type $$Ar—(Ch_2)_m—$$

e.g. 3,5-dimethoxyphenethyl; is either unsubstituted phenyl; phenyl substituted in at least one of the meta- and para-positions with $R^2$, e.g. 4-methoxy-3-methylphenyl; 2- or 3-thienyl; 2- or 3-furyl;

$R^1$ is straight chain alkyl having from 1 to 4 carbons; i.e. methyl, ethyl, propyl and butyl;

each $R^2$ is, independently, either methyl, ethyl or straight chain alkoxy having from 1 to 4 carbon atoms, i.e. methoxy, ethoxy, propoxy and butoxy;

$R^3$ is either a hydrogen atom; hydroxy (—OH); straight chain alkoxy having from 1 to 4 carbon atoms; i.e. methoxy, ethoxy, propoxy and butoxy; or, together with $R^4$, methylenedioxy (—O—CH₂—O—);

$R^4$ is either a hydrogen atom; hydroxy (—OH); straight chain alkoxy having from 1 to 4 carbon atoms; i.e. methoxy, ethoxy, propoxy and butoxy; or, together with $R^3$, methylenedioxy (—O—CH₂—O—);

n is either 3 or 4;
m is either 1 or 2;

and intermediates in the preparation thereof.

Compounds I are prepared according to the following reaction schemes:

A

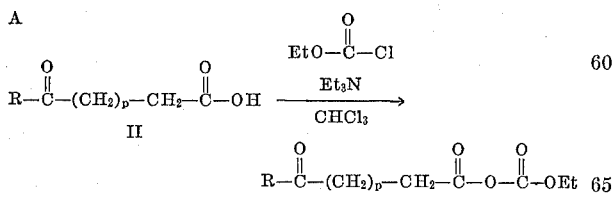

B

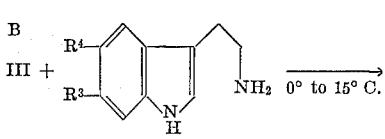

IV

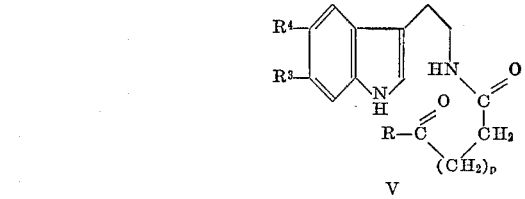

C

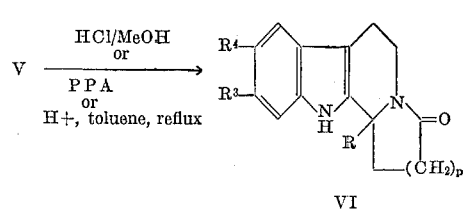

D

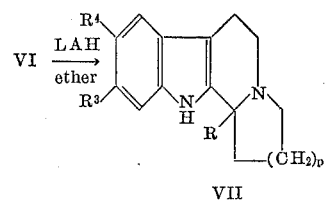

E

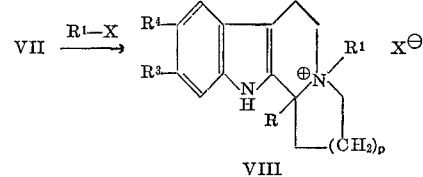

F

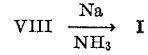

wherein:

p is 1 for precursors of compounds I wherein n is 3, and is 2 for precursors of compounds I wherein n is 4;

X is preferably a halide, e.g. chloride, bromide or iodide; and each of R, $R^1$, $R^2$, $R^3$ and $R^4$ has its above-ascribed meaning. [Each definition is used consistently through the disclosure in the absence of an indication to the contrary.]

According to the reaction scheme steps A and B are effected sequentially (without separation) to form a mixed anhydride V by admixing ethyl chloroformate (ethyl chlorocarbonate) with a keto acid II and triethylamine in chloroform at a temperature of from 0° to 15° C., followed by the admixture of a β-phenethylamine IV with the resultant (maintained in the same temperature range).

Step C is a cyclization. It is effected with from a 0.5 to 5.0 percent (by weight) methanolic solution of hydrogen chloride at a temperature within the range from room temperature (20° C.) to reflux. Alternatively, it is effected with polyphosphoric acid (PPA) at a temperature from 60° to 120° C. or with an acid, such as para-toluenesulfonic acid, in toluene under reflux.

Step D is effected by refluxing (with stirring) with lithium aluminum hydride (LAH) in an ether, such as diethylether, dibutylether, tetrahydrofuran (THF) and dioxane.

Step E is a standard quaternization. It is effected with, e.g. a lower alkyl halide $R^1$-X, e.g. methyl iodide, at room temperature in a solvent, e.g. an ether (diethylether or dioxane), either alone or in combination with another solvent, e.g. methylene chloride.

Step F is effected by adding sodium pellets to a suspension of compound VIII in liquid ammonia at a temperature of from −70° to −35° C. The temperature is maintained, e.g., by a Dry Ice/actone bath.

Compounds I are 3-R¹-7-R-10-R³-11 - R⁴-azonino[5,4-b]indoles and 3-R¹-8-R-11-R³-12 - R⁴ - azecino[5,4 - b]indoles. As each of these compounds has an asymmetric carbon (the carbon to which substituent R is bonded), said compounds exist as racemic mixtures or as stereoisomers. Although racemic mixtures (or racemates) are prepared according to the synthesis outlined herein, said racemic mixtures are resolved into their optical antipodes (enantiomers) according to procedures well-known to the art-skilled. The compounds designated as compounds I thus include the stereoisomers as well as racemic mixtures thereof.

Compounds I and VII are readily converted to their pharmaceutically acceptable acid addition salts according to standard established procedures. The preparation of particular acid addition salts and the isolation of chemical individuals, i.e., enantiomers, of compounds I (and corresponding acid addition salts) do not constitute essential parts of this invention, but the respective products are within the scope of this invention. The methods employed are known methods. When an optically active compound I is employed to prepare an acid addition salt, the resulting salt has the same stereochemistry as its precursor. Likewise, optically active compounds I are prepared from corresponding optically active compounds VI, VII and VIII. A compound VII is resolved, e.g., by preparing the tartrate from an enantiomer of tartaric acid.

The pharmaceutically acceptable acid addition salts of compounds I and compounds VII are useful for the same purpose and in the same manner as the free bases from which they are derived. Among the pharmaceutically acceptable acid addition salts are salts of organic acids, e.g., tartaric acid; inorganic acids, e.g., hydrochloric acid, hydrobromic acid and sulfuric acid; monobasic acids, e.g., an alkanesulfonic acid, such as methanesulfonic acid ($H_3C-SO_3H$); dibasic acids, e.g., succinic acid; tribasic acids, e.g., phosphoric acid and citric acid; saturated acids, e.g., acetic acid; ethylenically unsaturated acids, e.g., maleic acid and fumaric acid; and aromatic acids, e.g., salicylic acid and arylsulfonic acids, such as benzenesulfonic acid. The only limitation on the acid selected is that the resulting acid addition salt is pharmaceutically acceptable; the acid does not nullify the therapeutic properties of the free base.

Compounds I, compounds VI and compounds VII are central nervous system (CNS) active compounds. They have CNS stimulant activity and are useful as antidepressants. They are also useful as anti-inflammatories. (Compounds VII are further useful as hypotensive agents.) These compounds are administered to mammals, either orally or parenterally in standard dosage forms, e.g., tablets and capsules, in daily doses from 0.5 to 3.0 mg./kg. of body weight of the host, e.g. from 30 to 200 milligrams per day. Although the daily dosage may be administered in a single dose, it is preferred to have same administered in equal divided doses from two to four times per day.

Each of the pharmaceutically active compounds of this invention may be, e.g., incorporated, for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; an average dosage of active ingredient; and q.s. 100 percent of filler, e.g., lactose; all percentages being by weight. Tablets are prepared according to standard tabletting techniques, which are well-known in the art, employing the necessary amounts of conventional granulating liquids, e.g., alcohol SD–30 and purified water. An exemplary tabletting formulation for the instant active compounds is:

| | Parts |
|---|---|
| Title compound of Example 1 | 55 |
| Tragacanth | 2 |
| Lactose | 34.5 |
| Corn starch | 5 |
| Talcum | 3 |
| Magnesium stearate | 0.5 |
| Alcohol SD–30 | q.s. |
| Purified water | |

In the following examples all temperatures are in degrees centigrade. Parts and percentages are by weight for all solids (at room temperature unless otherwise indicated) and by volume for all liquids, i.e., in the absence of some statement to the contrary. The relationship between parts by weight and parts by volume is the same as that between the kilogram and the liter.

EXAMPLE 1

3-methyl-7-phenylazonino[5,4-b]indole

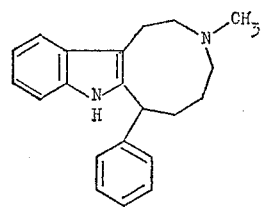

(a) N - [2-(3-indolyl)ethyl]-3-benzoylpropionamide.—Add a solution of 2.7 parts of ethyl chloroformate in 6 parts of chloroform dropwise (over a period of one hour) to a solution of 4.45 parts of 3-benzoylpropionic acid and 2.5 parts of triethylamine in 45 parts of chloroform. Cool and stir the resulting mixture in an ice bath for three hours. Over a period of ten minutes add to the thus-cooled mixture a solution of 4.0 parts of tryptamine in 15 parts of chloroform. Stir the resultant overnight (about 17 hours). Thereafter successively wash same with 2 N hydrochloric acid and with 1 N sodium carbonate

Dry the washed material over sodium sulfate before evaporating it to dryness. Crystallize the obtained residue (a), melting point (M.P.) 155° to 159°, from methanol.

(b) 1,2,3,5,6,11b - hexahydro - 11b - phenyl - 11H - indolizino[8,7-b]indol-3-one.—Reflux overnight a solution of 31 parts of (a) in 380 parts of methanol and 20 parts of concentrated hydrochloric acid. Dilute the resulting reaction mixture with 250 parts of water and cool the diluted reaction mixture to room temperature. Crystals, M.P. 257° to 258°, of (b) thus precipitate.

(c) 1,2,3,5,6,11b - hexahydro - 11b-phenyl-indolizino [8,7-b]indole hydrochloride.—Add a solution of 15 parts of (b) in 500 parts of THF to a solution of 8 parts of LAH in 500 parts of diethylether, and reflux the resultant overnight. Decompose the thus-prepared reaction mixture by adding water thereto. Then filter same through Celite. Evaporate the filtrate to dryness to obtain the free base as the residue.

Dissolve the residue in 1:3 methanol/diethylether. Pass excess hydrogen chloride gas through the resulting solution to precipitate (c). Recrystallize (c), M.P. 273° to 276°, from methanol/acetone.

(d) 1,2,3,4,5,6,11,11b - octahydro - 11b - phenylindolizino[8,7-b]indolium-4-methiodide.—Maintain a solution of 20 parts of the free base of (c), 20 parts of methanol, 60 parts of diethylether and 35 parts of methyl iodide overnight at 8°. Filter the precipitated crystals of (d).

(e) Add 5 parts of sodium to a stirred suspension (cooled in a Dry Ice/acetone mixture) of 20 parts of (d) in 500 parts of liquid ammonia. Stir the resulting mixture for one hour and then allow same to evaporate overnight. Crystallize the obtained residue (title compound), M.P. 117° to 119°, from methanol/water.

EXAMPLE 2

3-methyl-8-phenylazecino[5,4-b]indole

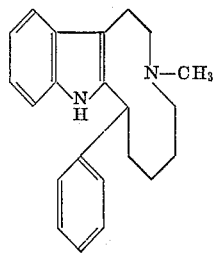

(a) N-[2-(3-indolyl)ethyl]-4-benzoylbutyramide.—Add a solution of 2.0 parts of ethyl chloroformate in 9 parts of chloroform dropwise (over a period of one hour) to a solution of 3.6 parts of 4-benzoylbutyric acid and 1.9 parts of triethylamine in 35 parts of chloroform. Cool and stir the resulting mixture in an ice bath for three hours. Over a period of ten minutes add to the thus-cooled mixture a solution of 3.0 parts of tryptamine in 15 parts of chloroform. Stir the resultant overnight. Thereafter successively wash same with 2 N hydrochloric acid and with 1 N sodium carbonate. Dry the washed material over sodium sulfate before evaporating it to dryness. Crystallize the obtained residue (a), M.P. 146° to 148°, from methanol.

(b) 1,2,3,4,6,7,12,12b-octahydro-12b-phenylindolo[2,3-a]quinolizin-4-one.—Reflux overnight a solution of 33 parts of (a) in 450 parts of methanol and 25 parts of concentrated hydrochloric acid. Dilute the resulting reaction mixture with 200 parts of water and cool the diluted reaction mixture to room temperature. Crystals, M.P. 266° to 269°, of (b) are thus precipitated.

(c) 1,2,3,4,6,7,12,12b-octahydro-12b-phenylindolo[2,3-a]quinolizine.—Add a solution of 25 parts of (b) in 600 parts of THF to a solution of 9 parts of LAH in 450 parts of diethylether, and reflux the resultant overnight. Decompose the thus-prepared reaction mixture by adding water thereto. Then filter same through Celite. Evaporate the fitrate to dryness. Crystallize the thus-obtained residue from diethylether/pentane to obtain (c), M.P. 178° to 180°.

(d) 1,2,3,4,5,6,7,12b-octahydro-12b-phenyl-12H-indolo[2,3-a]quinolizinium-5-methiodide. — Maintain overnight and at room temperature a solution of 11 parts of (c) in 30 parts of methanol and 30 parts of methyl iodide. Then place the resultant in a refrigerator (8°) for 24 hours. Filter the precipitated crystals of (d).

(e) To a stirred suspension of 14 parts of (d) in 400 parts of liquid ammonia (cooled in a Dry Ice/acetone mixture) add 4 parts of sodium. After stirring one hour, permit the resulting solution to evaporate overnight. Dissolve the thus-obtained residue in methanol, water and methylene chloride. Dry the methylene chloride layer over sodium sulfate before evaporating the solvent (methylene chloride) therefrom. Crystallize the residue from methanol to obtain the title compound, M.P. 187° to 188°.

EXAMPLE 3

3-methyl-7-(α-thienyl)azonino[5,4-b]indole

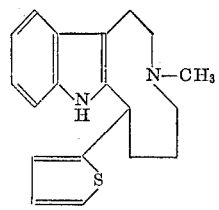

(a) N-[2-(3-indolyl)ethyl] - 3 - (α-thenoyl)propionamide.—Add a solution of 10.8 parts of ethyl chloroformate in 25 parts of chloroform dropwise (over a period of one hour) to a solution of 18.4 parts of 3-(α-thenoyl)-propionic acid and 10.1 parts of triethylamine in 175 parts of chloroform. Cool and stir the resulting mixture in an ice bath for three hours. Over a period of ten minutes add to the thus-cooled mixture a solution of 16 parts of tryptamine in 125 parts of chloroform. Stir the resultant overnight. Thereafter successively wash same with 2 N hydrochloric acid and with 1 N sodium carbonate. Dry the washed material over sodium sulfate before evaporating it to dryness.

Crystallize the obtained residue (a), M.P. 140° to 141° from methanol.

(b) 1,2,3,5,6,11b-hexahydro-11b-(2-thienyl) - 11H - indolizino[8,7-b]indol-3-one.—Reflux overnight a solution of 14.5 parts of (a) in 190 parts of methanol and 10 parts of concentrated hydrochloric acid. Dilute the resulting reaction mixture with 100 parts of water, and cool the diluted reaction mixture to room temperature. Crystals of (b), M.P. 205° to 206°, thus precipitate.

(c) 1,2,3,5,6,11b-hexahydro-11b-(2-thienyl) - 11H - indolizino[8,7-b]indole.—Add a solution of 11 parts of (b) in 180 parts of THF to a solution of 6 parts of LAH in 300 parts of diethylether, and reflux the resultant overnight. Decompose the thus-prepared reaction mixture by adding water thereto. Then filter same through Celite. Evaporate the filtrate to dryness and crystallize the residue from benzene/pentane to obtain (c), M.P. 125° to 126°.

(d) 1,2,3,4,5,6,11,11b-octahydro-11b-(2-thienyl)indolizino[8,7-b]-indolium-4-methiodide.—Maintain a solution of 20 parts of (c), 20 parts of methanol, 60 parts of diethylether and 35 parts of metyl iodide overnight at 8°. Filter the precipitated crystals of (d).

(e) Add 5 parts of sodium to a stirred suspension (cooled in a Dry Ice/acetone mixture) of 22 parts of (d) in 500 parts of liquid ammonia. Stir the resulting mixture for one hour and then allow same to evaporate overnight. The obtained residue is the title compound.

Following the procedures exemplified in Examples 1 to 3 and using the reactants II and IV (as specified in Tables A and B) and a suitable lower alkyl halide for quaternization, the corresponding compounds I are prepared:

TABLE A.—PREPARATION OF AZONINO[5,4-b]INDOLES

| II | IV | I |
|---|---|---|
| 3-acetylpropionic acid | Tryptamine | 3,7-dimethylazonino[5,4-b]indole. |
| 3-propionylpropionic acid | 5-hydroxytryptamine | 7-ethyl-11-hydroxy-3-methylazonino[5,4-b]indole. |
| 3-butyrylpropionic acid | 6-hydroxytryptamine | 3-ethyl-10-hydroxy-7-propylazonino[5,4-b]indole. |
| 3-valerylpropionic acid | 6-methoxytryptamine | 7-butyl-3-ethyl-10-methoxyazonino[5,4-b]indole. |
| 3-(β-thenoyl)propionic acid | 5-hydroxy-6-methoxytryptamine | 11-hyrdoxy-10-methoxy-3-propyl-7-(3-thienyl)azonino[5,4-b]indole. |
| 3-(2-furoyl)propionic acid | 5,6-dimethoxytryptamine | 7-(2-furyl)-10,11-dimethoxy-3-propylazonino[5,4-b]indole. |
| 3-(3-furoyl)propionic acid | 5,6-methylenedioxytryptamine | 3-butyl-7-(3-furyl)-10,11-methylenedioxy-azonino[5,4-b]indole. |
| 3-(benzylcarbonyl)propionic acid | 5-ethoxy-6-methoxytryptamine | 7-benzyl-3-butyl-11-ethoxy-10-methoxy-azonino[5,4-b]indole. |
| 3-(phenethylcarbonyl)propionic acid | 6-propoxytryptamine | 3-methyl-7-phenethyl-10-propoxyazonino[5,4-b]indole. |
| 3-(p-tolylethyl-carbonyl)propionic acid | 5-butoxytryptamine | 11-butoxy-3-methyl-7-(p-methylphenethyl-azonino[5,4-b]indole. |
| 3-(3,5-dimethyl-benzoyl)propionic acid | 5,6-dihydroxytryptamine | 10,11-dihydroxy-7-(3,5-dimethylphenyl)-3-methylazonino[5,4-b]indole. |

TABLE B.—PREPARATION OF AZECINO[5,4-b]INDOLES

| II | IV | I |
|---|---|---|
| 4-acetylbutyric acid | 5-hydroxytryptamine | 3-ethyl-12-hydroxy-8-methylazecino[5,4-b]indole. |
| 4-(α-thenoyl)butyric acid | 5,6-dihyroxytryptamine | 11,12-dihydroxy-3-propyl-8-(2-thienyl)azecino[5,4-b]indole. |
| 4-(β-thenoyl)butyric acid | 6-methoxytryptamine | 11-methoxy-3-methyl-8-(2-thienyl)azecino[5,4-b]indole. |
| 4-(α-furoyl)butyric acid | 5-ethoxytryptamine | 3-butyl-12-ethoxy-8-(2-furyl)azecino[5,4-b]indole. |
| 4-(β-furoyl)butyric acid | 5-propoxytryptamine | 8-(3-furyl)-3-methyl-11-propoxyazecino[5,4-b]indole. |
| 4-(3,4,5-trimethyl-benzoyl)butyric acid | 5-butoxytryptamine | 12-butoxy-3-methyl-8-(3,4,5-trimethylphenyl)azecino[5,4-b]indole. |
| 4-(p-methoxybenzoyl)butyric acid | 6-hydroxytryptamine | 11-hydroxy-8-(p-methoxy-phenyl)-3-methylazecino[5,4-b]indole. |
| 4-(p-butoxybenzoyl)butyric acid | 5,6-methylenedioxy-tryptamine | 8-(p-butoxyphenyl)-11,12-methylenedioxy-3-methylazecino[5,4-b]indole. |
| 4-(3-methoxy-4-methylbenzoyl)butyric acid | 5,6-diethoxytryptamine | 11,12-diethoxy-8-(3-methoxy-4-methylphenyl)-3-methylazecino[5,4-b]indole. |
| 4-(3,5-dimethoxy-phenethylcarbonyl)butyric acid | 5-methoxytryptamine | 12-methoxy-8-[β-(3,5-dimethoxyphenyl)ethyl]-3-methylazecino[5,4-b]indole. |
| 4-(3,4-diethyl-benzylcarbonyl) butyric acid | 5,6-dimethoxytryptamine | 8-(3,4-diethylbenzyl)-11,12-dimethoxy-3-methyl-azecino[5,4-b]indole. |
| 4-[β-(α-furyl)ethylcarbonyl]butyric acid | Tryptamine | 8-[β-(α-furyl)ethyl]-3-methylazecino[5,4-b]indole. |

All compounds II, compounds IV and the requisite lower alkyl halides R¹—X are either known compounds or are readily prepared by the art-skilled from available starting materials according to known procedures. Pharmaceutically acceptable acid addition salts of each of the compounds I enumerated in Tables A and B are prepared in a standard manner.

What is claimed is:

1. A compound of the formula:

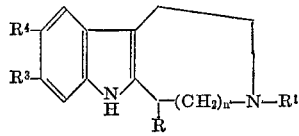

wherein:
R is a member selected from the group consisting of straight chain alkyl having from 1 to 4 carbon atoms, Ar and Ar—$(CH_2)_m$—;
R¹ is straight chain alkyl having from 1 to 4 carbon atoms;
each R² is, independently, a member selected from the group consisting of methyl, ethyl and straight chain alkoxy having from 1 to 4 carbon atoms;
m is one of the integers 1 and 2;
n is one of the integers 3 and 4;
R³ is a member selected from the group consisting of a hydrogen atom, hydroxy, straight chain alkoxy having from 1 to 4 carbon atoms and, together with R⁴, methylenedioxy;
R⁴ is a member selected from the group consisting of a hydrogen atom, hydroxy, straight chain alkoxy having from 1 to 4 carbon atoms and, together with R³, methylenedioxy;
Ar is a member selected from the group consisting of α-thienyl, β-thienyl, α-furyl, β-furyl, phenyl, and phenyl substituted in from 1 to 3 of the 3-, 4-, and 5-positions with R².
or a pharmaceutically acceptable acid addition salt thereof.

2. A compound according to claim 1 wherein n is 3 and a pharmaceutically acceptable acid addition salt thereof.

3. A compound according to claim 2 wherein R is a member selected from the group consisting of methyl, ethyl, propyl and butyl.

4. A compound according to claim 2 wherein R is a member selected from the group consisting of phenyl and phenyl substituted in from 1 to 3 of the 3-, 4-, and 5-positions with R².

5. The compound according to claim 4 which is 3-methyl-7-phenylazonino[5,4-b]indole.

6. A compound according to claim 2 wherein R is Ar—$(CH_2)_m$—.

7. A compound according to claim 2 wherein R is a member selected from the group consisting of furyl and thienyl.

8. A compound accoding to claim 1 wherein n is 4 and a pharmaceutically acceptable acid addition salt thereof.

9. A compound according to claim 8 wherein R is a member selected from the group consisting of methyl, ethyl, propyl and butyl.

10. A compound according to claim 8 wherein R is a member selected from the group consisting of phenyl and phenyl substituted in from 1 to 3 of the 3-, 4-, and 5-positions with R².

11. The compound according to claim 10 which is 3-methyl-8-phenylazecino[5,4-b]indole.

12. A compound according to claim 8 wherein R is Ar—$(CH_2)_m$—.

13. A compound according to claim 8 wherein R is a member selected from the group consisting of furyl and thienyl.

References Cited

Wawzonek et al.: J. Med. Chem., vol. 8, pp. 265–267 (1965).

HENRY R. JILES, Primary Examiner

G. T. TODD, Assistant Examiner

U.S. Cl. X.R.

260—293, 293.44, 294.7, 296, 326.13, 326.15; 424—274